United States Patent [19]

Brushenko

[11] 3,953,118
[45] Apr. 27, 1976

[54] RESET MECHANISM FOR AN AUDIO-VISUAL DEVICE

[75] Inventor: Anatoli Brushenko, Elmhurst, Ill.
[73] Assignee: GAF Corporation, New York, N.Y.
[22] Filed: June 5, 1974
[21] Appl. No.: 476,716

[52] U.S. Cl. ................................. 353/19; 353/110; 353/120; 274/1 R; 274/9 B
[51] Int. Cl.² .......................................... G03B 31/06
[58] Field of Search .............................. 353/15–19, 353/110; 274/1 R, 9 B, 1 A, 15

[56] References Cited
UNITED STATES PATENTS

| 3,484,160 | 12/1969 | Glass | 274/1 R |
| 3,572,704 | 3/1971 | Glass | 274/1 A |
| 3,836,241 | 9/1974 | Staav | 353/19 |

*Primary Examiner*—Richard E. Aegerter
*Assistant Examiner*—A. Jason Mirabito
*Attorney, Agent, or Firm*—Walter C. Kehm; Arthur Dresner

[57] ABSTRACT

An audio-visual unit includes a disc mounting a plurality of discrete image transparencies arranged in a continuous pattern for successive visual display; a record co-axially mounted on the disc includes separate recorded messages corresponding to respective transparencies on the disc. The projector includes an advance mechanism manually operable successively for intermittently rotating the disc thereby to present the transparencies in seriatim for visual display. An indexing mechanism is operated in response to actuation of the advance mechanism for intermittently moving a tone arm to successive positions corresponding to the starting grooves of respective messages on the record. A reset mechanism is connected with the indexing mechanism for locating the tone arm in a position corresponding to the beginning groove of a selected one of said messages; the reset mechanism is automatically actuated either by manually actuating the advance mechanism a predetermined number of times or by moving the advance mechanism to a "load" position.

10 Claims, 23 Drawing Figures

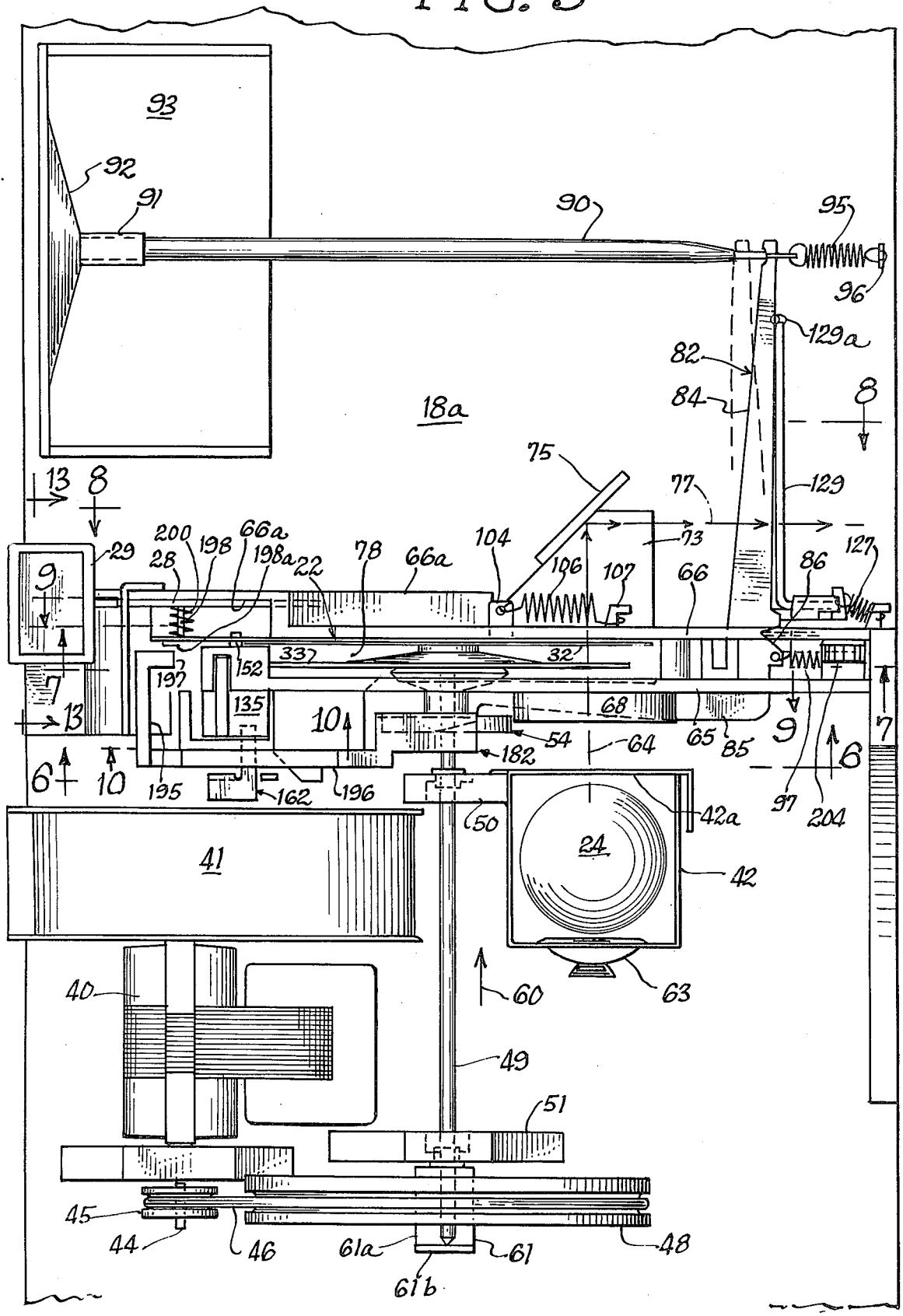

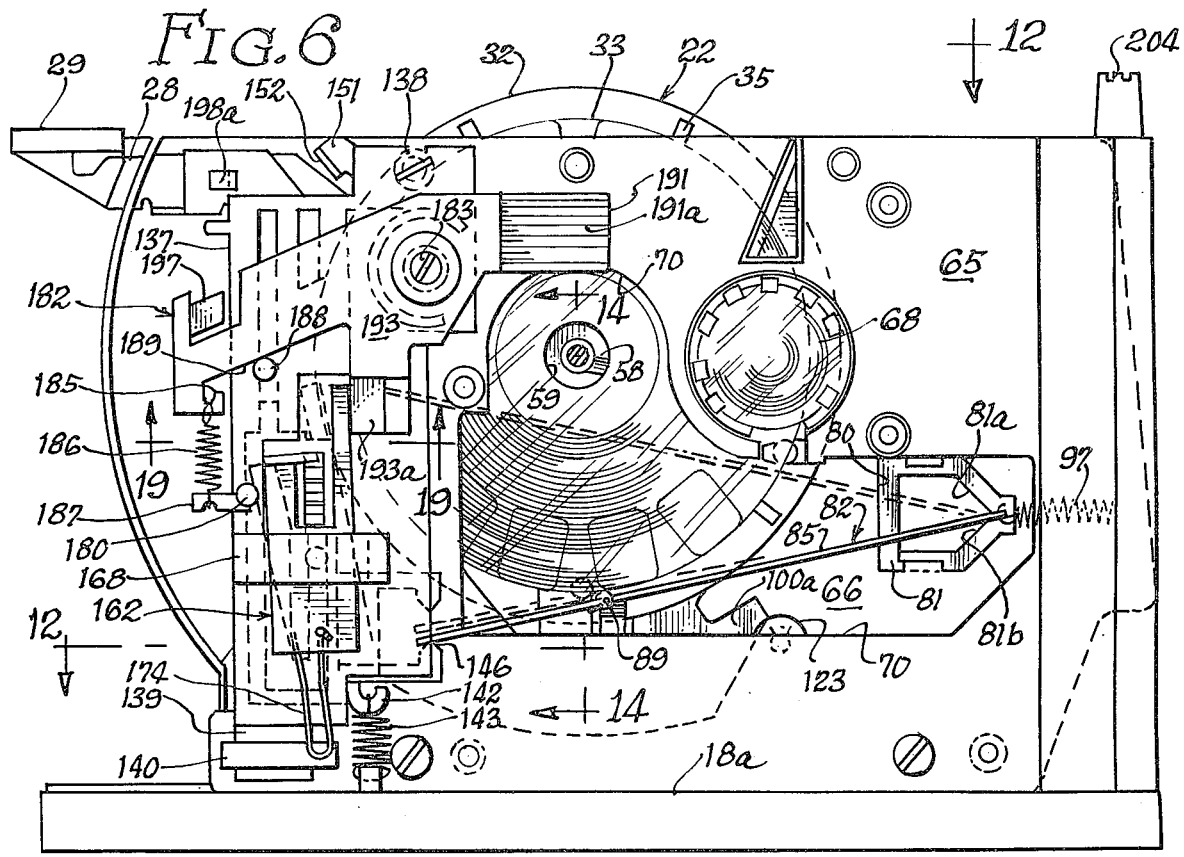
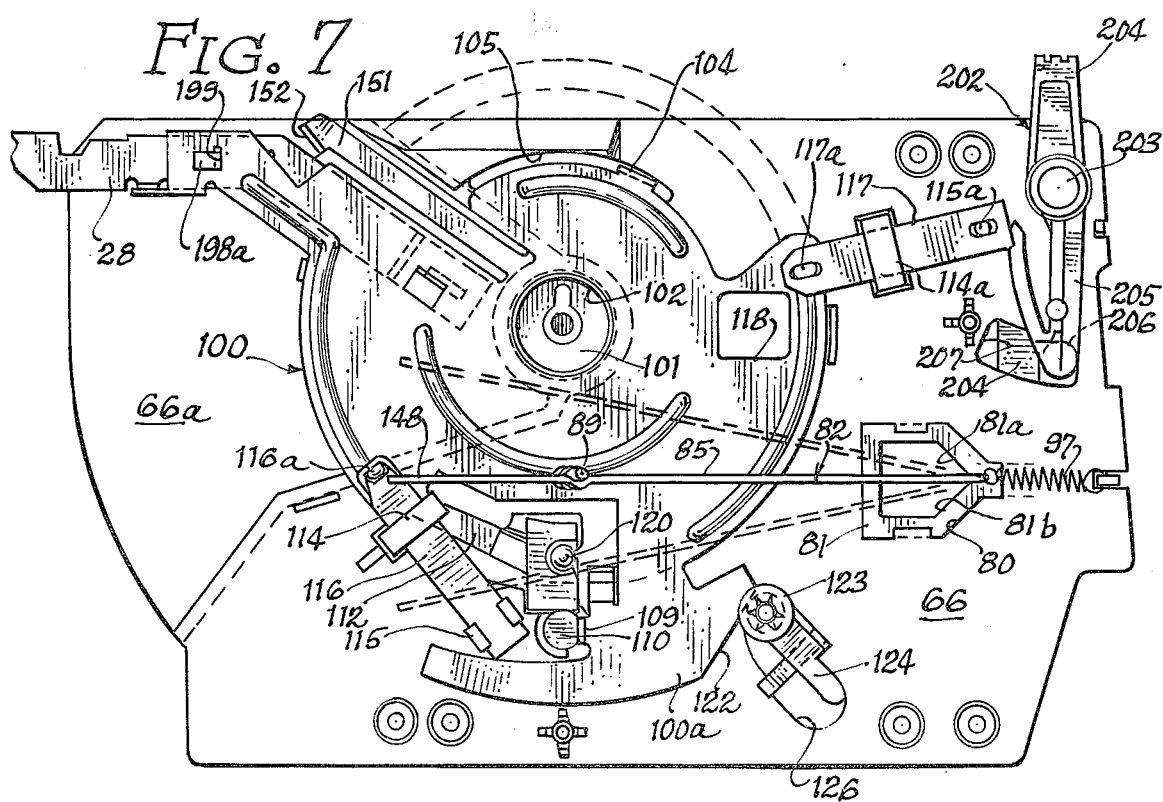

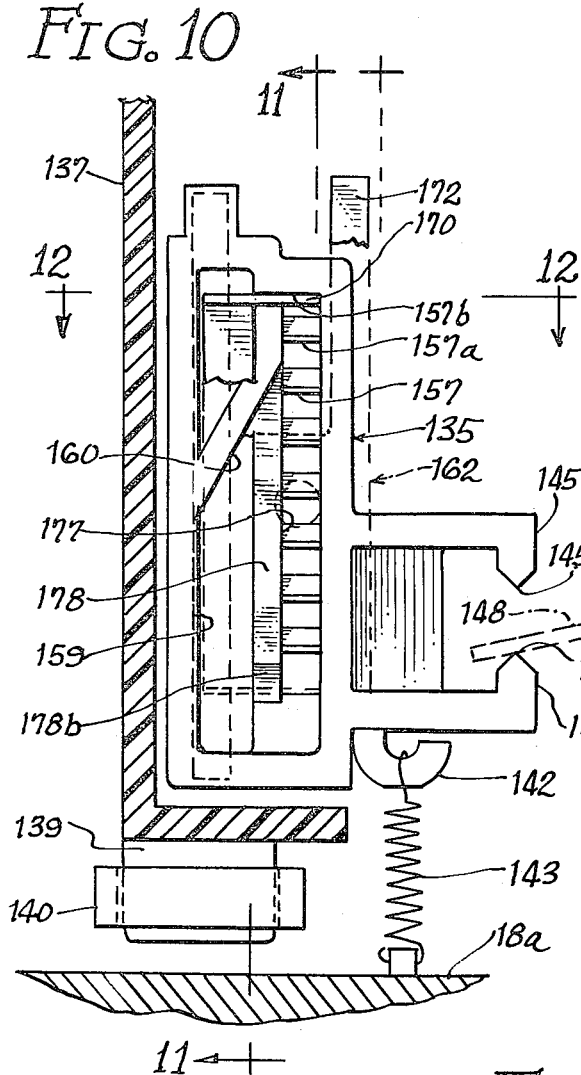
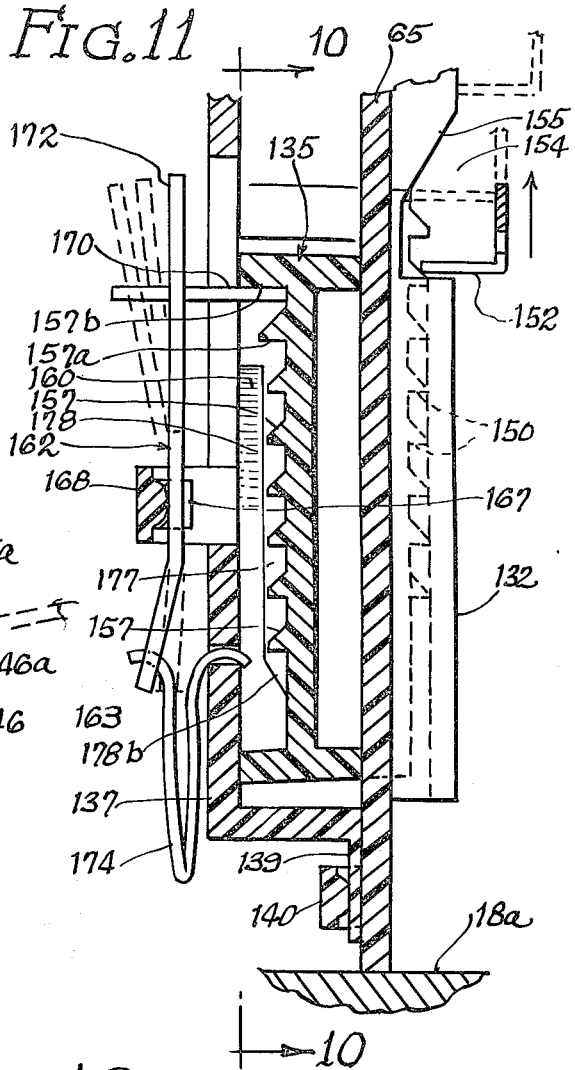
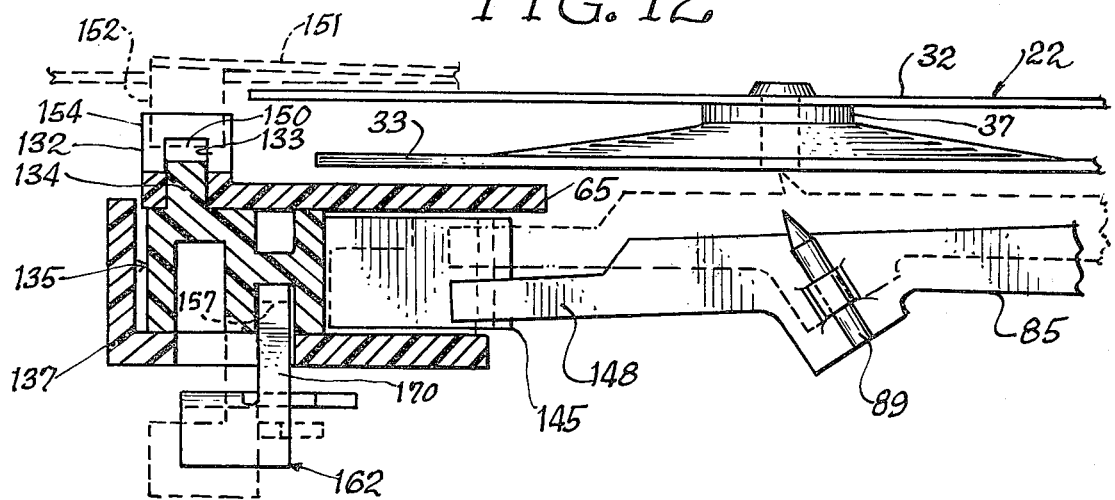

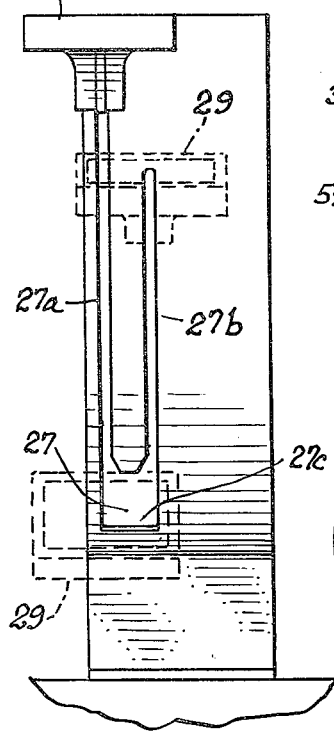
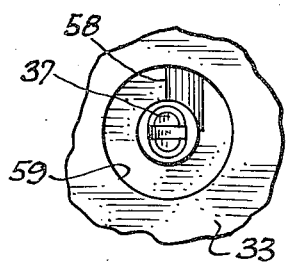
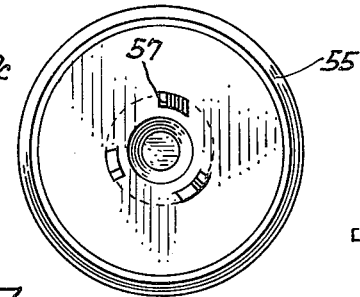
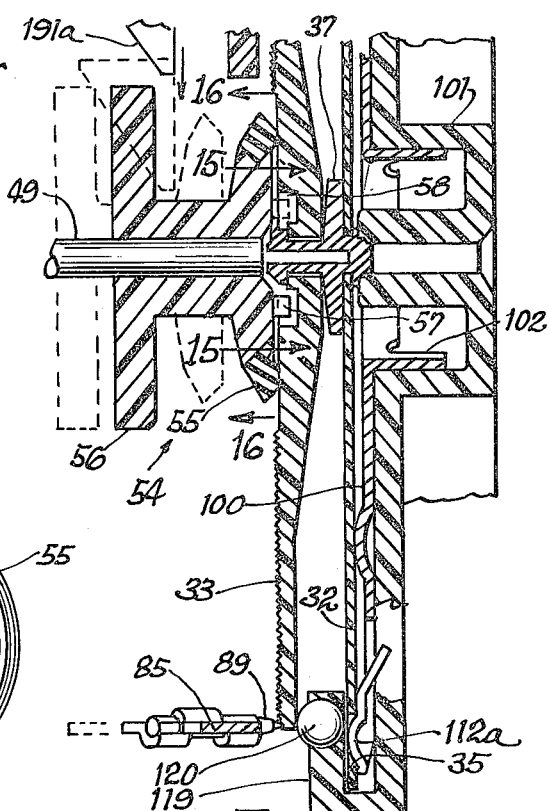
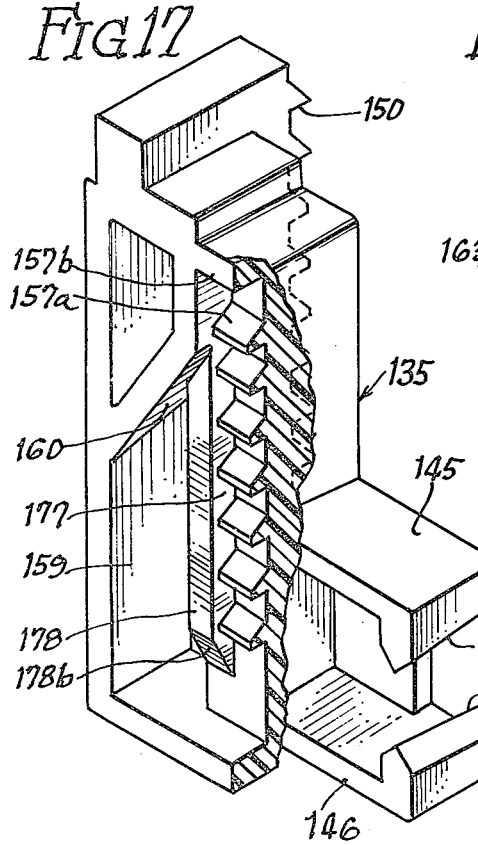
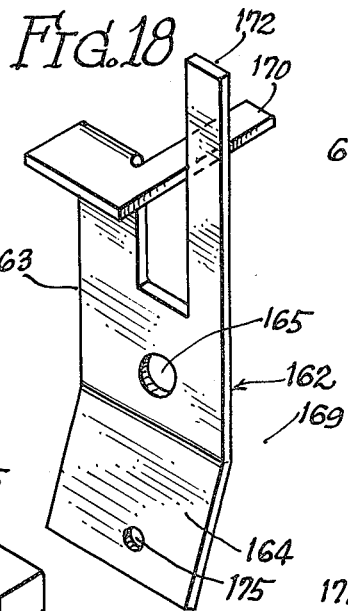
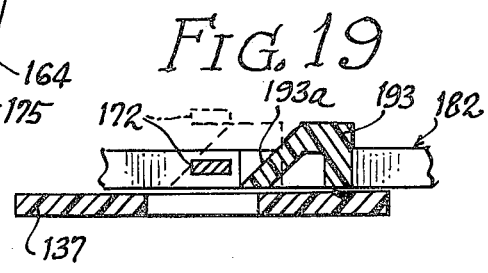

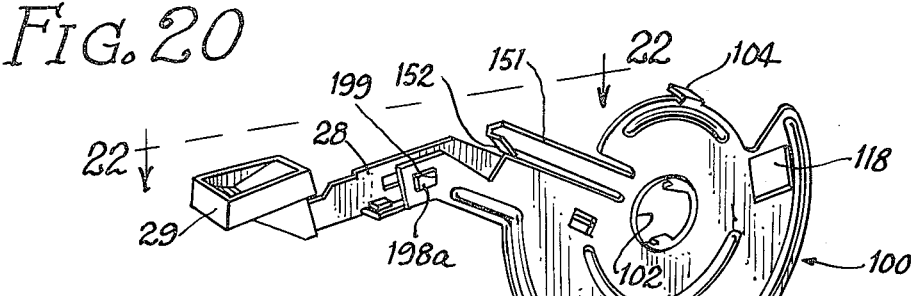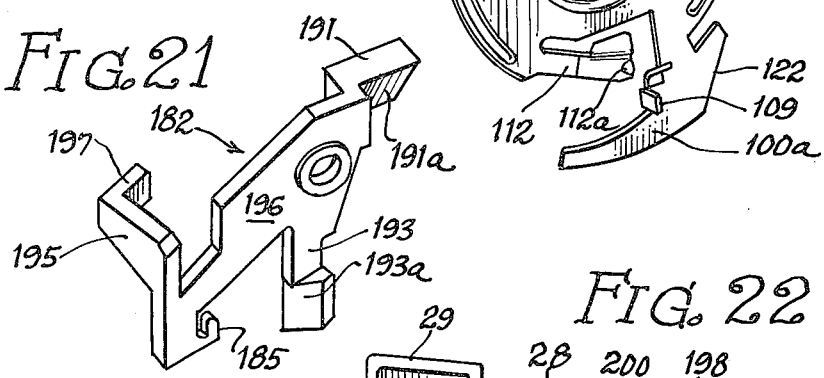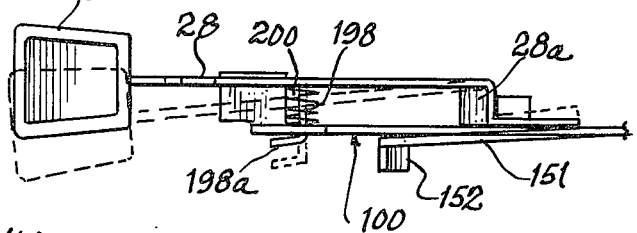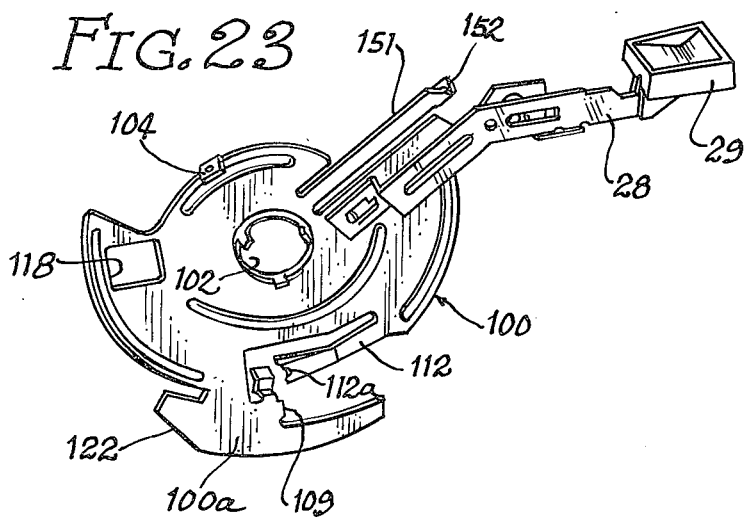

RESET MECHANISM FOR AN AUDIO-VISUAL DEVICE

BACKGROUND OF THE INVENTION

1. Field Of The Invention

The present invention relates to audio-visual devices of the type adapted for use with an audio-visual unit, wherein the latter includes a holder mounting a plurality of discrete image transparencies arranged in a continuous pattern for successive visual display and an associated record including separate recorded messages corresponding to respective transparencies on the holder. More particularly, the present invention relates to an automatic reset mechanism for locating the tone arm in a position corresponding to the beginning groove of a selected one of such messages in response to certain movement of the mechanism which is employed for advancing the transparency holder to present the transparencies thereon in seriatim for visual display.

2. The Prior Art

Audio-visual devices of the type under consideration are known in the prior art. In this regard, reference is made to U.S. Pat. No. 3,685,892, issued to Alan G. Lewis, and assigned to the assignee of the present invention. The device shown in the Lewis patent is in the form of an audio-viewer adapted to receive an audio-visual unit consisting of a circular transparency holder and a record co-axially mounted on the holder for rotation relative thereto. This transparency holder mounts a circular or continuous pattern of transparency pairs for stereoscopic viewing. The record includes separate recorded messages corresponding to respective transparency pairs on the circular holder or disc.

The audio-viewing device according to the aforementioned patent contains a slot for removably receiving an audio-visual unit of the type just described. A manually operable advancing mechanism is provided for intermittently rotating the transparency holder to present the transparency pairs in seriatim for stereoscopic viewing. An indexing mechanism is operated in response to this actuation of the advancing mechanism for intermittently moving the tone arm to successive positions corresponding to the starting grooves of respective messages on the record.

The viewer disclosed in the Lewis patent includes automatic reset mechanism for the tone arm, which mechanism is operated by a lug or projection formed on the transparency disc. After the last pair of transparencies have been viewed, this lug actuates a tripping mechanism within the audio-visual device for automatically positioning the tone arm to the beginning groove of the first message on the record. Thus, according to the mechanism shown in this patent, the transparency pairs may be continuously and repeatedly viewed and at all times in synchronization with the recorded messages.

Although the reset mechanism in the Lewis patent is generally satisfactory, it suffers from two disadvantages. One of the disadvantages results from the requirement of forming the projection or lug on the transparency holder or disc — it will be recalled from the foregoing description that such lug is necessary to actuate the tripping mechanism. This requirement complicates, to some degree, construction of the audio-visual unit which includes such transparency holder. Moreover, this requirement necessitates that the operator of the audio-viewer according to the Lewis patent must use the particular audio-visual unit described, i.e., a transparency holder with the projection or lug, to actuate the tripping mechanism and thus to enjoy the use of the automatic reset mechanism.

Another disadvantage flowing from the aforementioned Lewis construction resides in the fact that the operator must actuate a separate reset button or actuator to locate the tone arm in its proper position at the beginning of the audio-visual presentation. As more fully described in the Lewis patent, the operator must perform this step in order to establish initial synchronization between the beginning or starting transparency pair and the corresponding beginning audio message on the associated record.

SUMMARY AND OBJECTS OF THE INVENTION

The present invention relates to reset mechanism for an audio-visual device of the type described, which reset mechanism may be automatically brought into play for positioning of the tone arm in response to certain movement of the mechanism which is used to advance the transparency holder.

A first object of the present invention is the provision of reset mechanism for an audio-visual unit of the type described, which mechanism is automatically operated in response to actuation of the transparency advance mechanism for a number of times corresponding to the number of transparencies to be displayed during a single program or presentation.

A second object of the present invention is the provision of reset mechanism for an audio-visual unit of the type described, which reset mechanism is operated automatically in response to movement of the transparency advance mechanism to a load position, such movement of the advance mechanism facilitating removal of the audio-visual unit and replacement thereof by another audio-visual unit.

Another object of the present invention is the provision of reset mechanism of the type described and which is operable completely independently of the audio-visual unit.

These and other objects and advantages of the present invention will become apparent from the following specification disclosing a preferred embodiment shown in the accompanying drawings.

DESCRIPTION OF THE DRAWINGS

FIG. 5 is an enlarged, top plan view of the audio-visual device with the housing removed to show the various internal parts;

FIG. 6 is a section taken along the line 6—6 of FIG. 5;

FIG. 7 is a section taken along the line 7—7 of FIG. 5;

FIG. 10 is an enlarged section taken along the line 10—10 of FIG. 5;

FIG. 11 is a section taken along the line 11—11 of FIG. 10;

FIG. 12 is an enlarged, partial section and partial top plan view taken along the line 12—12 of FIG. 6;

FIG. 13 is an enlarged, fragmentary, side elevation taken along the line 13—13 of FIG. 5;

FIG. 14 is an enlarged section taken along the line 14—14 of FIG. 6;

FIG. 15 is a section taken along the line 15—15 of FIG. 14.

FIG. 16 is a section taken along the line 16—16 of FIG. 14;

FIG. 17 is an enlarged, isometric view of a component part of the automatic reset mechanism;

FIG. 18 is an enlarged, isometric view of another component part of the reset mechanism;

FIG. 19 ia an enlarged section taken along the line 19—19 of FIG. 6;

FIGS. 20 and 21 are respective isometric views of two component parts of the mechanism of the present invention;

FIG. 22 is a top view taken along the line 22—22 of FIG. 20; and

FIG. 23 is an isometric view of the part shown in FIG. 20, as seen from the other side thereof.

DESCRIPTION OF THE PREFERRED EMBODIMENT

Figure 1:
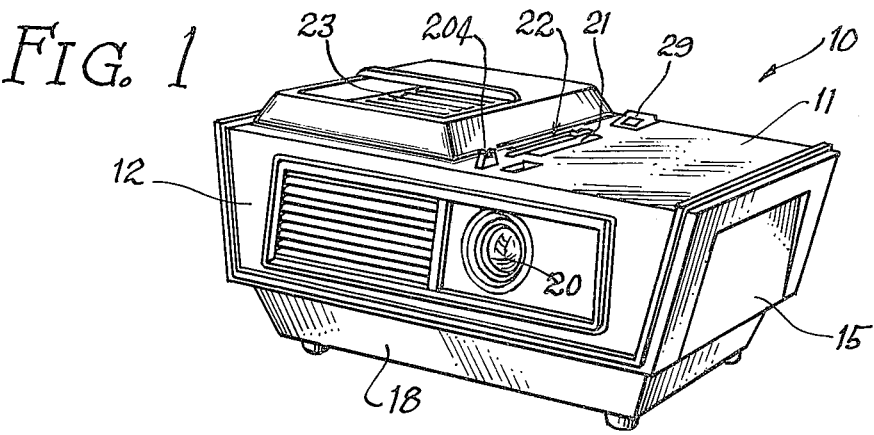
FIG. 1 is a perspective view of an audio-visual device embodying the present invention; this view shows the front, top and one side of the housing of this device.
Figure 2:
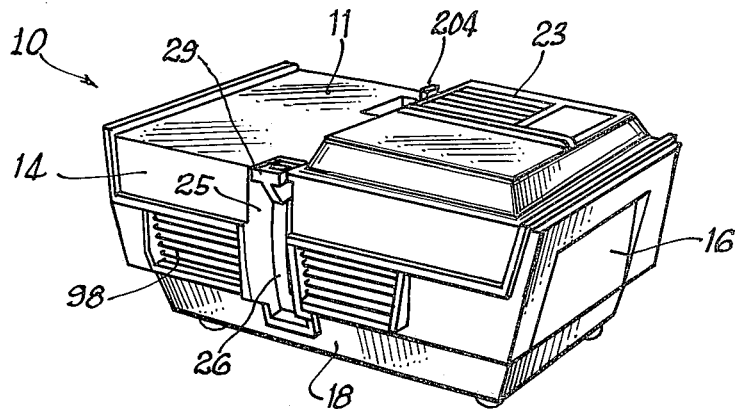
FIG. 2 is a perspective view of the audio-visual device, showing the top, rear and other side thereof.

Referring to FIGS. 1 and 2, the embodiment of the present invention shown for purposes of illustration is embodied within an audio-projector, generally designated 10. As will be seen from the following description, this device is adapted to project successive image transparencies on a remote screen, or other reflective surface, and to present a separate audible recorded message for each of the transparencies projected for visual display. It will be understood that the present invention is not to be limited for use with the particular audio-projector illustrated, or even with an audio or sound projector for that matter. For example, the present invention may be incorporated within a sound-viewer, stereoscopic or otherwise.

The projector 10 includes a housing having a top wall 11, front wall 12, rear wall 14, side walls 15, 16 and a bottom or base 18. The front wall 12 includes an opening for receiving an adjustable optical lens assembly 20; this assembly is of well known construction and is of the type used in slide and moving picture projectors. The top wall 11 includes a slot 21 for receiving an audio-visual unit, generally designated 22. This top wall also includes a louvered formation 23 to permit ventilation for the projection bulb 24 (FIG. 5).

The rear wall 14 of the housing includes a cavity 25 formed in part by a plate 26 (FIG. 13). This plate includes a generally U-shaped slot 27 receiving a portion of an advance lever 28 (FIG. 6) mounting an advance button 29 on the distal end thereof. As will become apparent herein, actuation of this advance button serves, among other things, to move the transparency holder intermittently for successive visual display of the transparencies thereon.

Figure 4:
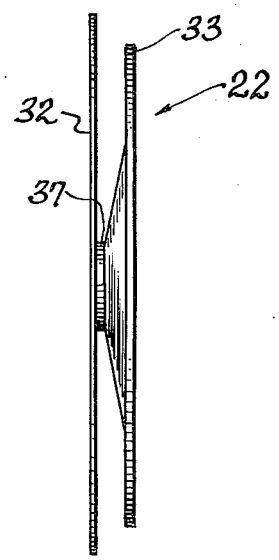
FIG. 4 is a side elevational view of the audio-visual unit shown in FIG. 3.
Figure 3:
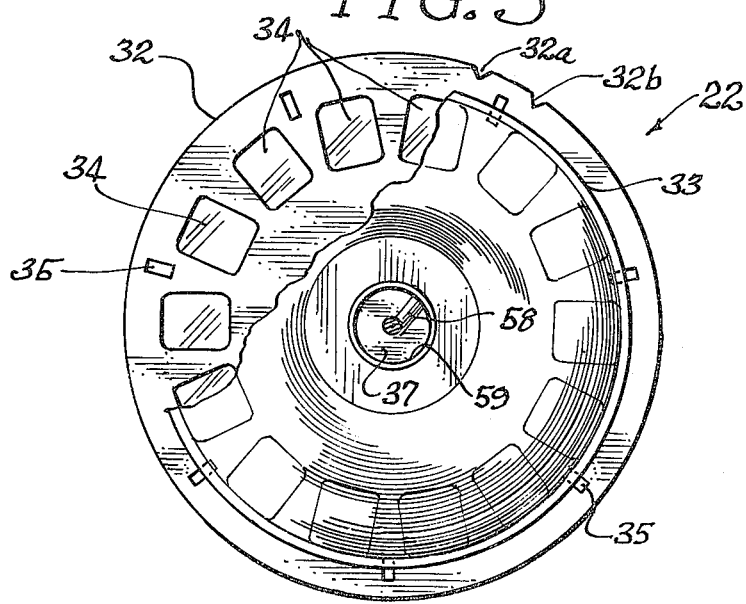
FIG. 3 is an enlarged elevational view of the audio-visual unit for use with the audio-visual device illustrated in FIG. 1 and 2.

Referring now particularly to FIGS. 3 and 4, the audio-visual unit is in the form of a disc 32 and a phonograph record 33 co-axially mounted therewith. The disc 32 includes seven pairs of transparencies, or fourteen individual transparencies 34, arranged in a circular or continuous pattern adjacent the periphery of the disc.

At this time it should be mentioned that the audio-visual unit is of the type disclosed and claimed in U.S. Pat. No. 3,423,230 in the names of Marvin I. Glass and Gunars Licitis and assigned to Marvin Glass & Associates. As will be understood by reference to that patent, the transparencies are provided in pairs for stereoscopic viewing in an audio-viewer of the type shown in U.S. Pat. No. 3,484,160 also in the names of Marvin I. Glass and Gunars Licitis and assigned to Marvin Glass & Associates. However, since the audio-projector 10 illustrated herein projects the images on a remote screen and does not provide for stereoscopic viewing, only one transparency 34 of each of the transparency pairs is actually projected. Thus, it will be understood that the audio-projector 10 which embodies the present invention may employ the same audio-visual units that are used in the audio-viewer disclosed in the aforementioned U.S. Patent No. 3,484,160.

The transparency disc 32 includes seven indexing apertures 35 equally spaced around the periphery thereof. As will be explained, these apertures are engaged by an advance pawl to permit the transparency disc to be intermittently rotated for successively presenting the transparencies for projection. The disc 32 mounts a hub 37 (FIG. 14) which rotatably mounts or journals the phonograph record 33. Thus, the record 33 is co-axially mounted by the disc 32 for rotation relative thereto.

It will be understood that the record 33 has seven separate messages recorded thereon. The first or starting message is recorded adjacent the periphery of the record. The record 33, which extends over the transparencies 34, is made of a transparent material, such as a clear vinyl, in order to permit the passage of light through the record as well as through the image transparencies.

The transparency disc 32 is preferably provided with either indicia, or in the embodiment shown for purposes of illustration, with a notch 32a in its periphery to aid the operator to orient or position the transparency disc in the proper position for the beginning of a program. The operator orients the disc 32 in a proper position at the beginning of a program by locating the notch 32a in alignment with suitable indicia on the top housing wall 11 adjacent the slot 21. The disc 32 may be provided with another notch 32b used to orient the transparency disc in the desired position when the audio-visual unit 22 is used with other equipment, such as the audio-viewer disclosed in the above mentioned Glass et al. U.S. Pat. No. 3,484,160. For a more complete description of the audio-visual unit 22, reference should be had to the aforementioned Glass et al. U.S. Pat. No. 3,432,230.

Referring to FIG. 5, the base 18 includes a base plate 18a which mounts an electric motor 40. This electric motor powers an impeller or blower assembly 41, of known construction, for cooling the projection bulb 24, the latter being contained within the usual chimney 42. One end of the output shaft 44 of the electric motor 40 mounts a drive pulley 45, which pulley is engaged with a drive belt 46. This drive belt is also in engagement with a larger fly-wheel type pulley 48. This fly-wheel is mounted on a shaft 49, the latter being rotatably mounted by journal assemblies 50, 51, each supported by the base plate 18a. It will be understood that the shaft 49 is mounted for axial sliding movement as well as for rotation by the journal assemblies 50, 51.

The shaft 49 supports at one of its ends a record driving hub, generally designated 54. As best seen in FIG. 14, this hub includes an annular driving flange 55 and an annular camming flange 56. The driving flange 55 is provided with one or more teeth 57 for being received in a recess 58 (FIG. 16) formed in an annular recess 59 in the record 33. This interengagement between one of the teeth 57 and the recess 58 provides a non-slipping type of engagement between the record and the hub 54 thereby to permit the latter to drive and rotate the record as will be referred to hereinbelow.

Referring back to FIG. 5, the shaft 49 is constantly urged in the direction of the arrow 60 by means of a leaf-spring 61. To this end, the spring 61 is in the form of a right-angle leaf-spring having one leg 61a suitably secured to the base plate 18a and the distal end of the other or upstanding leg 61b engaged with the end of the shaft 49. It will be apparent that the spring 61 acts to urge the driving hub 54 into engagement with the record 33 forming part of the audio-visual unit 22.

It is apparent that the electric motor 40 serves to drive or rotate the driving hub 54 in addition to powering the impeller or blower 41. Suitable switches (not shown) may be provided to energize the motor 40 and projection bulb 24 independently of each other, or these two components, or one of them, may be energized simply by plugging the electrical cord (not shown) into a wall outlet.

The chimney 42 includes the customary reflector 63 for reflecting part of the light energy from the bulb 24 in a direction indicated by the optical axis 64. Of course, the wall 42a of the chimney is suitably apertured to permit light to pass along the optical axis 64.

The base plate 18a forming part of the housing of the projector 10 mounts first and second wall plates 65, 66. Referring particularly to FIGS. 5 and 6, the plate 65 has an aperture mounting a condensor lens assembly 68 which cooperates with the reflector 63 to define the optical axis 64. The plate 65 includes a large opening 70 which serves, among other things, to permit the driving hub 54 to be brought into engagement with the record 33.

Figure 8:
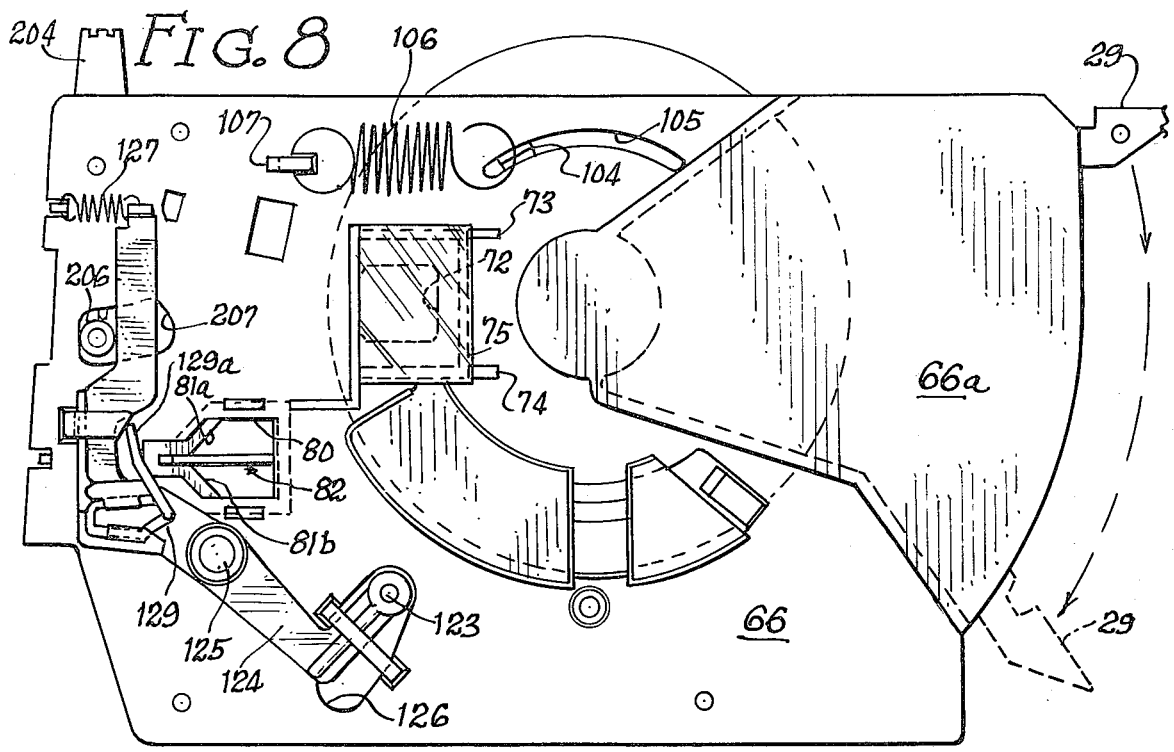
FIG. 8 is a section taken along the line 8—8 of FIG. 5.

Referring to FIGS. 5 and 8, the wall plate 66 includes an aperture 72 in alignment with the optical axis 64. Adjacent this aperture, the plate 66 mounts upper and lower brackets 73, 74, respectively, which brackets mount a mirror 75 inclined with respect to the optical axis 64 so that light is projected along the optical axis 77 and through the objective lens assembly 20 (FIG. 1).

The wall plates 65 and 66 cooperate to define a space 78 in communication with the slot 21 in the top housing wall 11. This space is, of course, provided to receive one of the audio-visual units 22.

The plate 66 includes an opening 80 mounting a bearing plate 81, the latter having an opening defined in part by edges 81a, 81b which constitute a V-shaped fulcrum for a tone arm, generally designated 82. As best seen in FIG. 5, this tone arm has a first leg 84 and a second leg 85. The leg 84 includes a V-shaped notch 86 in pivotal engagement with the fulcrum defined by bearing plate edges 81a, 81b; thus, it should be apparent that the tone arm 82 is mounted for pivoting engagement in its own plane and for pivoting movement between the solid and broken line positions shown in FIG. 7.

The leg 85 of the tone arm mounts a needle 89 (FIG. 12) for engagement with the phonograph record 33. The distal end of the other leg of the tone arm, i.e., the leg 84, is pivotally engaged with one end of an actuator stem 90 (FIG. 5). The other end of this stem is connected to a cylindrical formation 91 forming part of the speaker cone or diaphram 92. This speaker cone is suitably mounted in place by a bracket assembly 93.

A first spring 95 has one of its ends connected to the distal end of the tone arm 82 and the other of its ends appropriately anchored to a rigid, upstanding member 96 supported by the base plate 18a. Another spring 97 has one of its ends connected with the leg 84 of the tone arm adjacent the V-shaped notch 86, as seen in FIG. 5; the other end of this spring is suitably anchored in a fixed position. It will be understood that the springs 95 and 97 cooperate to hold the tone arm 82 in pivotal or swinging engagement with the fulcrum defined by the bearing plate edges 81a, 81b, but that the spring 95 overpowers the spring 97 to a degree sufficient to hold the needle 89 into proper engagement with the record. Of course, it will be apparent that engagement of the needle 89 with the grooves in the record 33 will serve to vibrate the tone arm 82 in its own plane thereby in turn to reciprocate the stem 90 for vibrating the speaker 92. This vibration of the speaker results in an audible reproduction of the recorded messages on the record. The rear housing wall 12 contains louvers 98 adjacent the speaker 92 to facilitate the passage of sound to the exterior of the projector housing.

Figure 9:
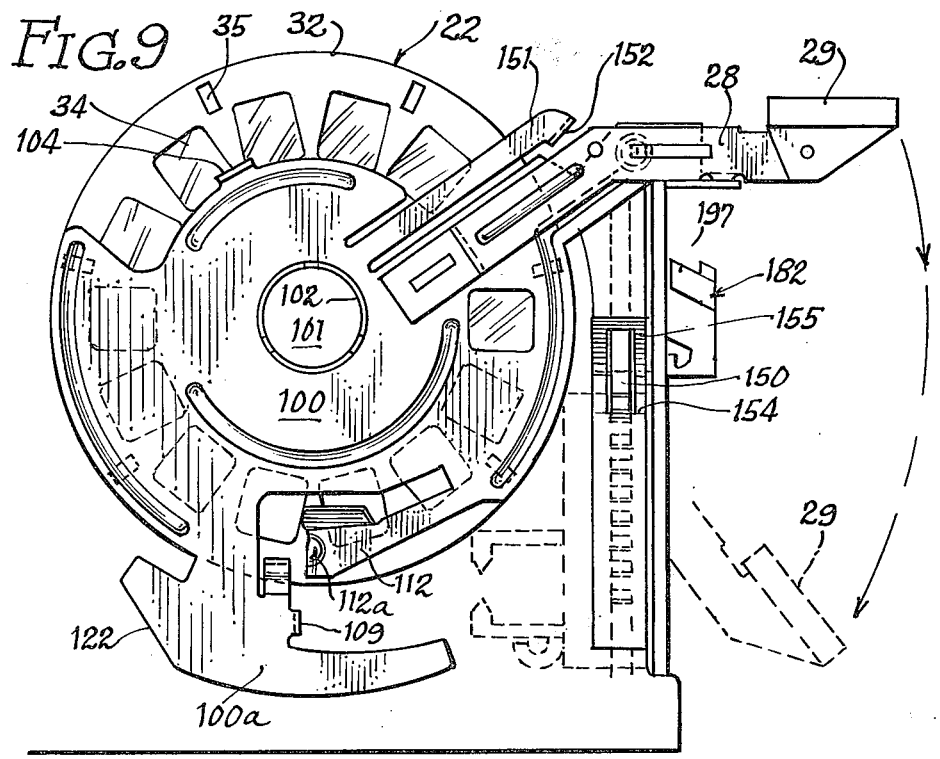
FIG. 9 is a partial section taken along the line 9—9 of FIG. 5.

Referring primarily to FIGS. 7 and 9, the plate 66 rotatably mounts an advance plate, generally designated 100. To this end, the plate 66 mounts a hub or bearing cap 101 (FIG. 14) rotatably receiving an annular flange 102 formed on the advance plate 100. It should be understood that this advance plate supports the previously mentioned advance lever 28 (FIGS. 20, 21, 22 and 23) and advance button 29. To this end, the lever 28 has an offset end 28a (FIG. 22) rivited or otherwise connected to the plate 100. The plate 66 is provided with an integral offset portion 66a to enclose and guide the advance lever 28 for oscillating or swinging movement. The advance plate 100 includes a projection 104 (FIG. 8) extending through an arcuate slot 105 formed in the plate 66. This projection is engaged by one end of a coil spring 106; the other end of this spring is connected to a projection 107 mounted on the plate 66. It will be understood that the spring 106 acts to urge the advance plate 100 in a counterclockwise direction as seen in FIGS. 8 and 9 (clockwise as seen in FIGS. 6 and 7). Rotation of the advance plate in the clockwise direction (FIGS. 6 and 7) is limited by engagement of a stop-finger 109 on the advance plate with a stop-formation 110 fixed to the plate 66.

The advance plate 100 includes an integral advance finger 112. The distal end of this finger includes a projection or lug 112a (FIGS. 9, 14 and 20) adapted to snap-in one of the apertures 35 in the transparency disc 32. It is this engagement between the lug 112a and the apertures 35 which permits the advance plate to rotate or index the transparency disc 32.

As noted in FIG. 7, the plate 66 includes bracket formations 114, 115 which serve to mount a spring-finger 116. This spring-finger has a lug 116a which is urged into engagement with the apertures 35 in the transparency disc 32 thereby to prevent rotation of the latter during return movement of the advance plate 100. Preferably, another spring-finger 117, similar or identical to the finger 116, is also provided to prevent return movement of the transparency disc 32. This finger includes a projection 117a adapted to be received in one of the apertures 35 in the transparency disc. The finger 117 is mounted from the plate 66 by suitable brackets or formations 114a, 115a. When an audio-visual unit 22 is forced downwardly through the slot 21, the transparency disc 32 slides between the plate 66 and the ends of the fingers 116, 117 for being securely held in place.

It should be apparent that successive actuation of the advance button 29 (downwardly and then upwardly between the solid and broken line positions indicated in FIGS. 8 and 9) will serve to impart intermittent rotation to the transparency disc 32 for presenting alternate transparencies 34 in series for projection on a remote screen or other reflective surface. In this regard, it will be noted from FIG. 7 that the advance plate 100 includs a projection aperture 118 which serves to define a projection gate; this aperture is in alignment with the optical axis 64 when the actuating button is in the normal or raised position (solid lines as seen in FIGS. 6, 8 and 9). The portion of the advance plate 100 adjacent the aperture 118 acts as a shutter to prevent projection of the bright light on the remote screen during indexing of the transparency disc.

Referring to FIG. 14, the plate 66 includes a formation 119 having an aperture mounting a bearing ball 120. This bearing ball engages and supports the record 33 adjacent the area thereof which is contacted by the needle 89. Thus, this bearing ball aids in the support of the record and improves the quality of the sound reproduction.

The advance plate 100 includes an integral co-planar extension 100a defining a camming edge 122. This camming edge is arranged to engage a roller 123 rotatably mounted at one end of an arm 124 (FIG. 8). This arm is mounted for pivotal movement about a hub 125, the latter being suitably supported from the plate 66. An aperture 126 is provided in the plate 66 to permit movement of the roller 123 and the arm 124 as a result of movement of the advance plate in a manner to be described hereinbelow.

The end of the arm 124 remote from the end thereof which supports the roller 123 is engaged by one end of a spring 127, the other end of which spring is appropriately anchored to the plate 66. Thus, the spring 127 acts to rotate the arm 124 counterclockwise (as seen in FIG. 8) to maintain the roller 123 in engagement with the camming edge 122. The arm 124 mounts a wire 129; the distal end 129a of this wire engages the leg 84 of the tone arm 82 as seen in FIG. 5. When the arm 124 is rocked clockwise (FIG. 8) the wire 129 is thereby moved bodily about the axis defined by the hub 125. Since the distal end 129a of the wire is engaged with the leg 84, this movement of the wire 129 acts to pivot the tone arm 82 in a counterclockwise direction (FIG. 5) in its own plane thereby to move the needle 89 away from the record 33. This rocking movement is imparted to the arm 124 (when the advance plate 100 is rotated to present a successive image transparency 34) as a consequence of the engagement between the camming surface 122 and the roller 123. Thus, each time the advance button 29 is depressed to bring a successive transparency into position for projection, the needle is momentarily moved away from the record.

Referring particularly to FIG. 12, the plate 65 includes an integral, linear formation 132 having a slot 133 extending the length thereof, which slot opens into or extends through the plate 65. The slot 133 slidably receives a rib 134 integral with a tone arm indexing block, generally designated 135. It will be understood that such indexing block is mounted, primarily by the slot 133, for vertical reciprocal movement. The indexing block 135 is held in place with its rib 134 in sliding engagement with the slot 133 by a retaining plate 137. This plate, which is generally right-angled in cross-section is secured adjacent its upper end to the plate 65 by means of a fastener 138 (FIG. 6). The plate 137 includes an integral tongue 139 (FIG. 10) at its lower end which is received within a strap-like formation 140, the latter being integral with or suitably fixed to the wall 65. The indexing block 135 includes an integral hook 142 engaged by one end of a coil spring 143. The other end of this spring is suitably anchored to the base plate 18a. It will be understood that the spring 143 acts to urge the indexing block downwardly.

The indexing block 135 includes upper and lower indexing fingers 145, 146, respectively, which fingers define opposed tone arm indexing stops 145a, 146a. The leg 85 of the tone arm 82 has an integral extension 148 (FIG. 12) which is received in or captured between the stops 145a, 146a. As will become clear from the following specification, the lower indexing stop 146a serves to locate the tone arm 82 such that the needle 89 is positioned for engaging the starting groove of each of the separate messages on the record 33.

It will be recalled that such messages are recorded from the outside of the record toward the center thereof. The vertical space between the stops 145a, 146a corresponds approximately to the width of the series of record grooves which constitute a single message. This vertical space permits the necessary movement of the tone arm relative to the indexing block 135 as the needle is moved inwardly by rotation of the record during the audible reproduction of each message. The upper indexing stop 145a arrests movement of the tone arm radially inwardly of the record and prevents the needle from leaving the last groove of a particular message and entering the starting groove of the successive message until after the indexing block 135 is indexed or stepped upwardly. As will become apparent the upper stop 145a cooperates with the lower stop 146a to define the vertical space already referred to and assists in returning the needle to the starting groove of the outermost or first message on the record during operation of the reset mechanism.

The rib 134 on the tone arm indexing block 135 has an integral formation of eight indexing teeth 150. Seven teeth are used to position the tone arm at the starting grooves of the seven individual messages — the eighth tooth is used to lift the indexing block for tripping the reset mechanism as will be explained below.

As best seen in FIGS. 7, 9, 20 and 23, the advance plate 100 includes an integral advancing finger 151 having the distal end thereof bent to form an advance pawl 152 (FIG. 11). The indexing finger 151 is biased for constantly urging the pawl 152 in a direction toward the plate 65. As seen in FIG. 11, the linear projection 132 has a cut-out portion or notch 154 defined in part by inclined camming walls 155. The notch 154 permits the pawl 152 to come into engagement with the teeth 150 during the downswing of the advance lever 28. During upward movement of the advance lever, the walls 155 serve to cam the pawl 152 out-of-engagement with the teeth 150. As will become apparent herein, this engagement between the teeth 150 and the advance pawl 152 serves to index or step the indexing block 135 upwardly for positioning the tone arm needle 89 at the beginning grooves of successive messages on the record 33.

The indexing block 135 includes another series of teeth 157 which again are equal in number to the number of messages on the record 33, namely seven. It will be noted that one of the teeth 157, i.e., the tooth 157a, projects outwardly a slightly greater distance than the remaining teeth. As best seen in FIG. 11, the tooth 157a is adjacent a ledge 157b, which ledge is provided to establish a "load" position on the indexing block as will be explained hereinbelow.

Referring particularly to FIG. 17, it is seen that the indexing block 135 is provided with a cavity defined in part by a vertical wall 159 and an inclined or camming wall 160. It is also noted that the wall 160 is inclined to or extends toward the tooth 157a. The purpose of the walls 159 and 160 will soon become apparent.

A reset plate, generally designated 162 (FIG. 18), includes a first planar portion 163 and another planar portion 164 which is bent or inclined with respect to portion 163. The portion 163 includes an aperture 165 which loosely receives a projection 167 (FIG. 11) integrally formed on a bar 168, the latter being either integral with or fixed to the retaining plate 137. It will be understood that this engagement between the projection 167 and the aperture 165 mounts the reset plate 162 for pivoting movement in the plane of its planar portion 163 as well as for movement about an axis 169 (FIG. 18) between the solid and broken line positions shown in FIG. 11. The reset plate 162 includes a pawl 170 arranged to engage the teeth 157 as well as the ledge 157b. The reset plate also includes an upstanding extension 172.

The U-shaped or hair-pin type spring wire 174 (FIGS. 6 and 11) has one end thereof received within a small aperture formed within the retaining plate 137. The other end of this spring wire is received within a small aperture 175 (FIG. 18) formed in the planar portion 164 of the reset plate. It will be understood that the spring wire 174 serves both to urge the pawl 170 into engagement with the teeth 157 as well as to urge the reset plate 162 in a counterclockwise direction (FIG. 6) — normally this counterclockwise movement is prevented by engagement of the pawl 170 with a wall 177 (FIG. 17) formed on the indexing block adjacent the teeth 157. The wall 177 is formed in part by a rib 178 which terminates at its lower end by an inclined portion 178b adjacent the lowermost tooth 157. When the pawl 170 is separated from the teeth 157 (and the manner in which this is accomplished will be explained below) the spring wire 174 acts to move the reset plate 162 counterclockwise from the solid to the broken line positions shown in FIG. 6; such movement of the reset plate is arrested by means of a stop pin 180 mounted on the retaining plate 137.

As best seen in FIGS. 6 and 21, a load-lever, generally designated 182, is pivotally mounted by a pin or hub 183, the latter being suitably secured to the retaining plate 137. The load-lever includes an integral hook 185 engaged by one end of a spring 186. The other end of this spring is secured to a projection 187 integral with or fixed to the retaining plate 137. The spring 186 acts to urge the load-lever 182 in a counterclockwise direction (FIG. 6), movement of the load-lever in this direction being arrested by a stop pin 188 which abuts an edge surface 189 on the load-lever. The pin 188 is suitably fixedly mounted on the retaining plate 137.

The load-lever 182 includes an arm 191 having an inclined camming surface 191a. When the load-lever 182 is rotated in a clockwise direction (FIG. 6), the camming surface 191a is brought into engagement with the camming flange 56 (FIG. 14) of the hub 54 for disengaging the driving flange 55 from the record 33.

The load-lever includes another arm 193 having an inclined camming wall 193a. When the load-lever is rotated in a clockwise direction (FIG. 6), the camming wall 193a is brought into engagement with the projection 172 on the reset plate (FIGS. 18 and 19) for separating the pawl 170 from the particular tooth 157 with which it is engaged.

Referring to FIGS. 5, 6 and 21, the load-lever 182 has an integral arm 195 extending perpendicularly with the planar portion 196 of the load-lever. This arm includes a finger 197 extending at a right-angle therewith. The advance lever 28 includes a projection 198 (FIGS. 20 and 22) having a bent end portion 198a. The projection 198 extends through a small aperture 199 in the advance plate 100. A coil spring 200 encircles the projection 198 and serves to urge the advance lever 28 away from the advance plate and to hold the finger 198a against the portion of the advance plate adjacent the aperture 199. When the advance lever 28 is bent toward the advance plate 100, the finger 198a will be brought into a position where it will engage the finger 197 on the load-lever during the upswing of the advance lever thereby to impart clockwise rotation (FIG. 6) to the load-lever.

Referring to FIG. 13, it is seen that the U-shaped slot 27 has a rectangular portion 27a and a somewhat shorter parallel portion 27b, these two portions communicating via a bight portion 27c. It will be understood that the advance lever 28 oscillates up and down in the slot portion 27a thereby to intermittently step or rotate the disc 32 for presenting the alternate transparencies 34 for projection. When the advance lever 28 is in its lowermost position in alignment with the slot portion 27a, the slot portion 27c permits the advance lever to be bent toward the advance plate 100 and into alignment with the slot portion 27b whereupon the advance lever will be moved into the slot portion 27b on the upswing of the advance lever. The advance button 29 (secured to the distal end of the advance lever 28) is shown in broken lines in FIG. 13 in its uppermost position as defined by the upper end of slot 27b; this may be referred to as the "load" position of the actuator button 29.

The operation of the mechanism thus far described is as follows:

Assume that the actuator button 29 is moved to the "load" position as just described. Such movement of the load button causes the finger 198a on the advance lever to be brought into engagement with the finger 197 on the load-lever 182 for rotating the same counterclockwise (FIG. 6). Such rotation of the load-lever performs two functions. First, the cam surface 191a is brought into engagement with the camming flange 56 on the hub 54 for moving the driving flange 55 away from the record 33 so that an audio-visual unit 22 may be received in and/or removal from the projector 10 through the slot 21. Second, the camming surface 193a is brought into engagement with the projection 172 on the reset plate for camming the pawl 170 away from the teeth 157. Separation of the pawl 170 from the teeth 157 will allow the spring 143 to move the tone arm indexing block 135 downwardly until such movement is arrested by reason of the ledge 157b coming into engagement with the pawl 170. This downward movement of the indexing block 135 will pivot the tone arm 82 such that the needle 89 is located adjacent the periphery of the record 33. The needle will not, of course, be in engagement with a record groove as the aforementioned movement of the advance button to the "load" position will cause the needle to be lifted away from the record as a consequence of rotation of the advance plate 100 and the engagement between the camming edge 122 and the roller 123. An audio-visual unit 22 may now be removed from the projector through the slot 21 and another such audio-visual unit mounted in place in the space 78 which is provided between the plates 65, 66 and which communicates with the slot 21. The transparency disc 32 is manually rotated until the indexing notch 32a is positioned in alignment with the starting mark or other indicia mounted on the housing wall 11 adjacent the slot 21.

The advance lever is then returned to its starting position (the solid line position shown in FIG. 13). Such movement of the advance button will separate the finger 198 on the advance lever from the finger 197 on the load-lever allowing the latter to be returned (counterclockwise as seen in FIG. 6) to its rest position determined by the stop 188. Such rotation of the load-lever will withdraw the camming surface 191a away from the camming flange 56 thereby to permit the spring 61 to force the driving flange 55 into driving engagement with the record 33. This rotation of the load-lever will also withdraw the camming surface 193a away from the projection 172 on the reset plate permitting free movement of the latter.

The clockwise rotation of the advance plate 100 as a consequence of upward movement of the advance lever 28 to its uppermost or starting position in the slot 27a will cause the pawl 152 to engage the uppermost tooth 150 and step the indexing block 135 upwardly until the pawl 170 on the reset plate snaps under the tooth 157a. This location of the indexing block as established by the pawl 170 engaging the tooth 157a will position the needle 89 for engaging the outermost groove on the first message on the record, which first message is recorded adjacent the periphery of the record 33.

This first message will now be audibly reproduced as the first transparency 34 is viewed on the remote screen. The necessary movement of the needle is of course provided by the space between the indexing stops 145a, 146a. When the audio message has been completely presented the needle 89 will skip over the spiral record groove as the stop 145a prevents further movement of the needle radially inwardly of the record. This will produce an audible signal indicating to the operator that the presentation of the first message is complete. Thereupon, the operator will depress the actuating button 29 to its lowermost position as defined by the advance lever 28 engaging the lowermost portion of the slot 27a; the advance button 29 is either manually lifted or allowed to be returned to its uppermost position by the spring 106. This movement of the advance button will rotate the transparency disc for locating the next transparency 34 (separated by one transparency from the previously projected transparency) in the optical axis 64 for projection. The rotation of the advance plate 100 which causes the just mentioned rotation of the transparency disc will also lift or index the indexing block 135 to its next position by reason of the engagement of the pawl 152 with the teeth 150. This next or uppermost position of the indexing block is of course determined by the pawl 170 on the reset plate engaging the tooth 157 which is adjacent the first or starting tooth 157a.

It will be apparent that successive actuation of the actuator button 29 as just described will cause the alternate transparency images 34 on the record disc 32 to be projected in series and that the tone arm will be indexed to provide an audible reproduction of the messages which correspond to the respective transparencies being projected. Synchronization between the image projected and its accompanying audio message (which was initially established by proper manual positioning of the transparency disc 32 and movement of the actuator button 29 to a "load" position) will of course be maintained.

When the last transparency is viewed and the audible reproduction of its accompanying message is completed, the pawl 170 on the reset plate 162 will of course be in engagement with the lowermost tooth 157. If it is desired to repeat the audio-visual presentation constituted by a particular record reel unit 22, the actuating button 29 is simply cycled again in the normal manner. In such event, when the pawl 152 lifts the indexing block 135 the next increment during the upswing of the advance lever 28, the pawl 170 will be separated from the wall 177 (the latter terminates at the inclined surface 178b)) whereupon the spring 174 will swing the reset plate counterclockwise (FIG. 6). This movement of the reset plate will force the pawl 170 away from the teeth 157 whereupon the spring 143 will cause the indexing block 135 to move downwardly. During this downward movement of the indexing block, the inclined wall 160 will engage the pawl 170 and cam the same into engagement with the first or starting tooth 157a thereby to arrest downward movement of the indexing block and to locate the needle 89 in a position for entering the starting groove on the outermost or first message on the record 33. Thus, the first transparency 34 in the series or program of transparencies will again be projected and its accompanying message on the record will be audibly reproduced.

Accordingly, it is apparent that the audio-visual program of a particular audio-visual unit 22 may be repeatedly continuously presented by successive actuation of the actuator button 29 in the manner already described. In other words, the tone arm indexing block 135 is automatically reset to its starting or beginning position in response to cycling of the advance plate 100 a number of times, equal to the number of audio-visual presentations which constitute a complete program. In the embodiment of the invention shown herein for purposes of illustration, the indexing block is automatically reset when the advance plate is cycled the seventh time after initial operation of the advance plate to locate the transparency disc with the first or starting transparency in position for projection and with the tone arm in position for engaging the starting groove of the first message. In this respect, the teeth 157 and the pawl 170 may be considered as a counting mechanism for resetting the tone arm at the proper time. Of course, the tone arm is also automatically reset when the advance button 29 is moved to the "load" position.

It is sometimes desirable to replay or repeat the audio message while its associated image transparency remains projected on the remote screen. The projector 10 according to the present invention provides such mechanism.

Referring to FIGS. 7 and 8, a replay lever, generally designated 202, is pivotally mounted intermediate its ends by a hub or pin 203, the latter being supported by the plate 66. The replay lever has one arm portion 204, the distal end of which extends through a suitable opening in the housing wall 29 thereby to permit manual actuation of the replay lever. The replay lever has another arm 205, the distal end of which mounts a roller 206. This roller extends through an enlarged opening 207 formed in the plate 66.

It is seen from FIG. 7 that the roller 206 engages the lever 124. When the replay lever 202 is swung clockwise (FIG. 7), the roller 206 imparts clockwise rotation (FIG. 8) to the arm 124 thereby to swing the wire 129 about the hub 125 which in turn causes the tone arm 82 to pivot in its own plane to disengage needle 89 from the record. When the needle is so disengaged momentarily from the record, it is allowed to fall downwardly under the action of gravity until the tone arm extension 148 strikes the indexing stop 146a whereupon the needle will be positioned for entering the starting groove of the particular recorded message which has just been played.

I claim:

1. In an audio-visual device of the type adapted for use with a removable audio-visual unit including a transparency holder and an associated sound record disc having a plurality of grooves therein for recorded messages, wherein such holder mounts a plurality of discrete image transparencies arranged in a continuous pattern for successive visual display and wherein said record includes separate recorded messages corresponding to respective transparencies on said holder, the improvement comprising:
    a. an advancing mechanism operable successively through a first cycle for intermittently moving said holder thereby to present said transparencies in seriatim for visual display;
    b. a tone arm;
    c. indexing mechanism operated in response to actuation of said advancing mechanism and engaging said tone arm for intermittently moving the latter to successive incremental positions corresponding to the starting grooves of respective messages on said record, said indexing mechanism including a reciprocally and slidably mounted member engaging said tone arm to effect positioning thereof; and
    d. a reset mechanism independent of said audio-visual unit, said reset mechanism being connected with said indexing mechanism for automatically positioning said slidable member to locate said tone arm in a position corresponding to the beginning groove of a selected one of said messages in response to movement of said advancing mechanism through said first cycle for a number of times bearing a predetermined relationship to the number of transparencies on said holder.

2. In an audio-visual device of the type adapted for use with an audio-visual unit including a transparency holder and an associated sound record, wherein such holder mounts a plurality of discrete image transparencies arranged in a continuous pattern for successive visual display and wherein said record includes separate recorded messages corresponding to respective transparencies on said holder, the improvement comprising:
    a. an advancing mechanism operable successively through a first cycle for intermittently moving said holder thereby to present said transparencies in seriatim for visual display;
    b. a tone arm;
    c. indexing mechanism operated in response to actuation of said advancing mechanism and engaging said tone arm for intermittently moving the latter to successive positions corresponding to the starting grooves of respective messages on said record;
    d. reset mechanism independent of said audio-visual unit, said reset mechanism being connected with said indexing mechaniam for automatically locating said tone arm in a position corresponding to the beginning groove of a selected one of said messages in response to movement of said advancing mechanism through a second cycle; and
    e. guide means associated with said advancing mechanism for defining a load position of the latter, movement of said advancing mechanism to said load position constituting said second cycle and permitting removal of said audio-visual unit and replacement of another such unit.

3. The improvement according to claim 2 further defined by:
    a. said audio-visual device having a housing and means defining a slot for receiving said record;
    b. a rotary drive member arranged for co-axial driving engagement with said record for rotating the latter, and support means mounting said rotary drive member for axial movement into and out of engagement with said record; and
    c. an element arranged for engagement with said rotary drive member for moving the same out of engagement with said record in response to movement of said advancing mechanism to said load position.

4. In an audio-visual device of the type adapted for use with a removable audio-visual unit including a transparency holder and an associated sound record, wherein such holder mounts a plurality of discrete image transparencies arranged in a continuous pattern for successive visual display and wherein said record includes separate recorded messages corresponding to respective transparencies on said holder, the improvement comprising:
    a. an advancing mechanism operable successively through a first cycle for intermittently moving said holder thereby to present said transparencies in seriatim for visual display;
    b. a tone arm;
    c. indexing mechanism operated in response to actuation of said advancing mechanism and engaging said tone arm for intermittently moving the latter to successive positions corresponding to the starting grooves of respective messages on said record;
    d. reset mechanism independent of said audio-visual unit, said reset mechanism being connected with said indexing mechanism for automatically locating said tone arm in a position corresponding to the beginning groove of a selected one of said messages in response to movement of said advancing mechanism through said first cycle for a number of times bearing a predetermined relationship to the number of transparencies on said holder;

e. an indexing member mounted for reciprocal sliding movement, said indexing member having a formation engageable with the tone arm;
f. first biasing means engaged with said indexing mechanism and urging the same in one direction;
g. first and second sets of teeth on said indexing member, the number of teeth of at least said second set of teeth bearing a predetermined relationship with said number of transparencies, said second set of teeth having a start tooth and a finish tooth;
h. an advance pawl movable with said advancing mechanism and engageable with said first set of teeth for intermittently advancing said indexing member in the other direction in response to successive operation of said advancing mechanism through said first cycle;
i. a movably mounted release member having an indexing pawl engageable with said second set of teeth for determining the successive positions of said indexing member as it is moved in said other direction in response to movement of said advancing mechanism;
j. said indexing member including a track having one end thereof extending to said start tooth for guiding said indexing pawl into engagement therewith; and
k. second biasing means engaged with said release member for forcing said indexing pawl out of engagement with said finish tooth and into said track when said indexing member is moved to a predetermined position by operation of said advancing mechanism whereupon said first biasing means is permitted to move said indexing member in said first direction causing said track to guide said indexing pawl into engagement with said start tooth.

5. The improvement according to claim 4 further defined by:
a. guide means associated with said advancing mechanism for defining a load position of the latter, movement of said advancing mechanism to said load position permitting removal of an audio-visual unit and replacement of another such unit; and
b. a lever arm arranged to engage said release member upon movement of said advancing mechanism to said load position, said lever arm acting to cam said indexing pawl into said track for allowing said first biasing means to move said indexing member in said first direction until said start tooth is engaged by said indexing pawl.

6. The improvement according to claim 5 further defined by:
a. said audio-visual device having a housing and means defining a slot for receiving said record;
b. a rotary drive member arranged for co-axial frictional driving engagement with said record for rotating the latter, and support means mounting said rotary drive member for axial movement into and out of engagement with said record; and
c. said lever arm having a formation arranged for engagement with said rotary drive member for moving the same out of engagement with said record in response to movement of said advancing mechanism to said load position.

7. In an audio-visual device of the type adapted for use with a removable audio-visual unit including a transparency holder and an associated sound record, wherein such holder mounts a plurality of discrete image transparencies arranged in a continuous pattern for successive visual display and wherein said record includes separate recorded messages corresponding to respective transparencies on said holder, the improvement comprising:
a. an advancing mechanism operable successively through a first cycle for intermittently moving said holder thereby to present said transparencies in seriatim for visual display, and also operable through a second cycle permitting removal of an audio-visual unit and replacement of another such unit;
b. a tone arm;
c. indexing mechanism operated in response to actuation of said advancing mechanism through said first cycle and engaging said tone arm for intermittently moving the latter to successive positions corresponding to the starting grooves of respective messages on said record; and
d. reset mechanism independent of said audio-visual unit, said reset mechanism being connected with said indexing mechanism for automatically locating said tone arm in a position corresponding to the beginning groove of a selected one of said messages;
   i. in response to movement of said advancing mechanism through said first cycle for a number of times bearing a predetermined relationship with the number of said transparencies; or
   ii. in response to movement of said advancing mechanism through said second cycle.

8. The improvement according to claim 7 further defined by:
a. said audio-visual device having a housing and means defining a slot for receiving said record;
b. a rotary drive member arranged for co-axial frictional driving engagement with said record for rotating the latter, and support means mounting said rotary drive member for axial movement into and out of engagement with said record; and
c. an element arranged for engagement with said rotary drive member for moving the same out of engagement with said record in response to movement of said advancing mechanism through said second cycle.

9. The improvement according to claim 7 further defined by:
a. an indexing member mounted for reciprocal sliding movement, said indexing member having a formation engageable with the tone arm;
b. first biasing means engaged with said indexing mechanism and urging the same in one direction;
c. first and second sets of teeth on said indexing member, the number of teeth of at least said second set of teeth bearing a predetermined relationship with said number of transparencies, said second set of teeth having a start tooth and a finish tooth;
d. an advance pawl movable with said advancing mechanism and engageable with said first set of teeth for intermittently advancing said indexing member in the other direction in response to successive operation of said advancing mechanism through said first cycle;
e. a movably mounted release member having an indexing pawl engageable with said second set of teeth for determining the successive positions of said indexing member as it is moved in said other direction in response to movement of said advancing mechanism;

f. said indexing member including a track having one end thereof extending to said start tooth for guiding said indexing pawl into engagement therewith;

g. second biasing means engaged with said release member for forcing said indexing pawl out of engagement with said finish tooth and into said track when said indexing member is moved to a predetermined position by operation of said advancing mechanism through said first cycle through said number of times whereupon said first biasing means is permitted to move said indexing member in said first direction causing said track to guide said indexing pawl into engagement with said start tooth;

h. guide means associated with said advancing mechanism for defining a load position of the latter, movement of said advancing mechanism to said load position constituting said second cycle; and i. a lever arm arranged to engage said release member upon movement of said advancing mechanism to said load position, said lever arm acting to cam said indexing pawl into said track for allowing said first biasing means to move said indexing member in said first direction until said start tooth is engaged by said indexing pawl.

10. The improvement according to claim 9 further defined by:

a. said audio-visual device having a housing and means defining a slot for receiving said record;

b. a rotary drive member arranged for co-axial frictional driving engagement with said record for rotating the latter, and support means mounting said rotary drive member for axial movement into and out of engagement with said record; and c. said lever arm including a formation arranged for engagement with said rotary drive member for moving the same out of engagement with said record in response to movement of said advancing mechanism to said load position.

* * * * *